(12) United States Patent
Damera-Venkata

(10) Patent No.: US 8,781,814 B2
(45) Date of Patent: Jul. 15, 2014

(54) METHOD FOR LOCATING LINE BREAKS IN TEXT

(75) Inventor: Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 13/260,349

(22) PCT Filed: Sep. 15, 2009

(86) PCT No.: PCT/US2009/057055
§ 371 (c)(1),
(2), (4) Date: Sep. 25, 2011

(87) PCT Pub. No.: WO2011/034524
PCT Pub. Date: Mar. 24, 2011

(65) Prior Publication Data
US 2012/0166181 A1    Jun. 28, 2012

(51) Int. Cl.
*G06F 17/28* (2006.01)
*G06F 17/27* (2006.01)
*G06F 17/21* (2006.01)

(52) U.S. Cl.
USPC .............. 704/9; 704/4; 715/255; 715/256; 715/234; 715/245; 715/275; 715/244

(58) Field of Classification Search
USPC ............ 715/245, 275, 244, 255, 256, 234; 704/4, 9
See application file for complete search history.

(56) References Cited

U.S. PATENT DOCUMENTS

| | | |
|---|---|---|
| 6,510,441 B1 | 1/2003 | Kenninga |
| 6,647,533 B1 | 11/2003 | Liu et al. |
| 6,948,119 B1 | 9/2005 | Farmer et al. |
| 7,069,508 B1 * | 6/2006 | Bever et al. ............... 715/234 |
| 7,191,390 B2 | 3/2007 | Williamson et al. |
| 7,191,396 B2 | 3/2007 | Williamson et al. |
| 7,197,695 B2 | 3/2007 | Williamson et al. |
| 7,227,558 B1 | 6/2007 | Arata |
| 7,246,311 B2 | 7/2007 | Bargeron et al. |
| 7,346,489 B1 * | 3/2008 | Bever et al. ............... 704/4 |
| 7,444,586 B1 | 10/2008 | Wormley |
| 7,596,752 B2 * | 9/2009 | Marks et al. ............... 715/255 |
| 7,743,324 B1 * | 6/2010 | Bever et al. ............... 715/244 |
| 7,770,111 B2 * | 8/2010 | Burago et al. ............. 715/256 |
| 8,209,601 B2 * | 6/2012 | Bever et al. ............... 715/244 |
| 8,306,356 B1 * | 11/2012 | Bever et al. ............... 382/275 |
| 2013/0047078 A1 * | 2/2013 | Bever et al. ............... 715/245 |

OTHER PUBLICATIONS

R. Bouckaert, "A Probabilistic Line Breaking Algorithm", Pringer-Verlag, LNAI 2903, p. 390-401, 2003.*
Chen et al., "Extraction of text layout structures on document images based on statistical characterization", SPIE, vol. 2422/139, 1995.*

(Continued)

*Primary Examiner* — Pierre-Louis Desir
*Assistant Examiner* — Anne Thomas-Homescu

(57) ABSTRACT

A method for locating line breaks in text, carried out by a computer device having a processor and system memory, includes the steps of creating a probabilistic model of a paragraph of text, parameterized by inter-word spacing, and running an inference on the model to find a sequence of line-breaks that maximize the joint probability of line break positions with minimum deviation of inter-word spacing from an ideal value.

14 Claims, 1 Drawing Sheet

(56) References Cited

OTHER PUBLICATIONS

Research Report, Proceedings of the Third International Workshop on Document Layout Interpretation and its Applications (DLIA2003), Aug. 2, 2003.*

Wrenn et al., "An Unsupervised Machine Learning Approach to Segmentation of Clinician-Entered Free Text", AMIA 2007 Sumposium Proceedings.*

* cited by examiner

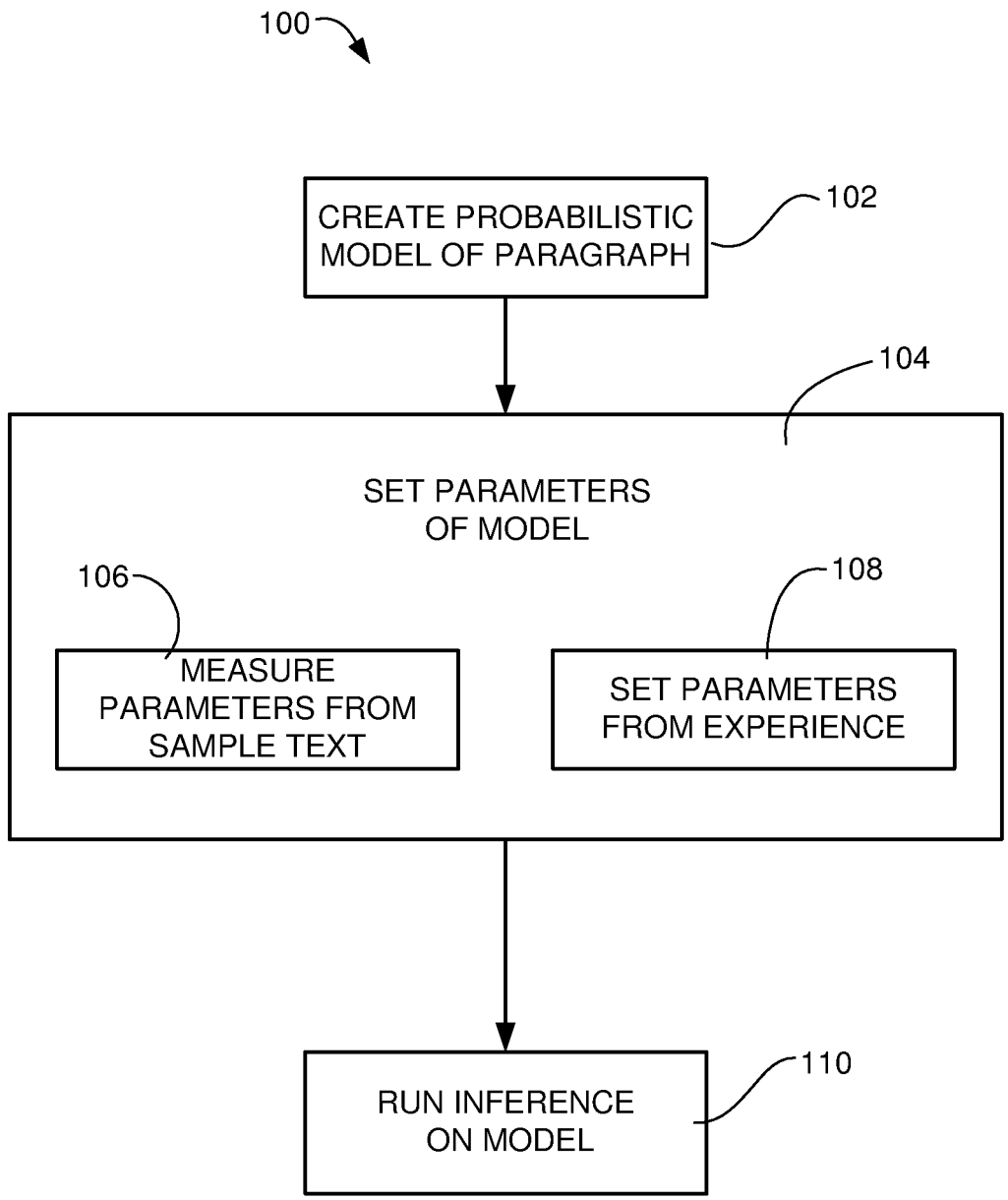

METHOD FOR LOCATING LINE BREAKS IN TEXT

BACKGROUND

Breaking the text constituting a paragraph into lines is a fundamental challenge in print rendering. Most automated typesetting systems in use today use the classic algorithm by Knuth and Plass, published in 1981, to automatically determine line break locations and break up paragraphs into approximately evenly spaced lines. Knuth's algorithm is based on a heuristic "demerit" function, and has been modified in various ways over the past decades.

The Knuth method involves adjusting multiple variables until reaching a desired outcome. Consequently, the Knuth method is not particularly intuitive, and does not allow a system to "learn" from existing, professionally-set type.

BRIEF DESCRIPTION OF THE DRAWING

Various features and advantages of the present disclosure will be apparent from the detailed description which follows, taken in conjunction with the accompanying drawing, which illustrates, by way of example, features of the present disclosure, and wherein:

FIG. 1 is a flowchart of the steps involved in one embodiment of a method for locating line breaks in text, in accordance with the present disclosure.

DETAILED DESCRIPTION

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As used herein, directional terms, such as "top," "bottom," "front," "back," "leading," "trailing," etc, are used with reference to the orientation of the figures being described. Because components of various embodiments disclosed herein can be positioned in a number of different orientations, the directional terminology is used for illustrative purposes only, and is not intended to be limiting.

As used herein, the term "computer" refers to any type of computing device, including a personal computer, mainframe computer, portable computer, PDA, smart phone, or workstation computer that includes a processing unit, a system memory, and a system bus that couples the processing unit to the various components of the computer. The processing unit can include one or more processors, each of which may be in the form of any one of various commercially available processors. Generally, each processor receives instructions and data from a read-only memory (ROM) and/or a random access memory (RAM). The system memory typically includes ROM that stores a basic input/output system (BIOS) that contains start-up routines for the computer, and RAM for storing computer program instructions and data.

A computer typically also includes input devices for user interaction (e.g., entering commands or data, receiving or viewing results), such as a keyboard, a pointing device (e.g. a computer mouse), microphone, camera, or any other means of input known to be used with a computing device. The computer can also include output devices such as a monitor or display, projector, printer, audio speakers, or any other device known to be controllable by a computing device. In some embodiments, the computer can also include one or more graphics cards, each of which is capable of driving one or more display outputs that are synchronized to an internal or external clock source.

The term "computer program" is used herein to refer to machine-readable instructions, stored on tangible computer-readable storage media, for causing a computing device including a processor and system memory to perform a series of process steps that transform data and/or produce tangible results, such as a display indication or printed indicia.

The term "computer-readable media" as used herein includes any kind of memory or memory device, whether volatile or non-volatile, such as floppy disks, hard disks, CD-ROMs, flash memory, read-only memory, and random access memory, that is suitable to provide non-volatile or persistent storage for data, data structures and machine-executable instructions. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and optical disks, such as CD, CDROM, DVD-ROM, DVD-RAM, and DVD-RW. Any of the above types of computer-readable media or related devices can be associated with or included as part of a computer, and connected to the system bus by respective interfaces. Other computer-readable storage devices (e.g., magnetic tape drives, flash memory devices, and digital video disks) also may be used with the computer.

As noted above, determining the locations of line breaks in a paragraph of text is a fundamental challenge in print rendering. Breaking paragraphs into lines at optimal positions is desirable for professional looking printed text and reflow. One approach to this challenge is manual typesetting by a professional. However, those of skill in the art will be aware that this approach is slow and expensive. First-fit typesetting can also be used, but this approach is generally considered sub-optimal because inter-word spacings often end up being too large or too small.

Many systems for automated typesetting today use the algorithm by Knuth and Plass to determine the location of line breaks. See D. Knuth and M. Plass, "Breaking Paragraphs Into Lines", Software Practice and Experience, vol. 11, pp. 1119-1184, (1981). The Knuth algorithm is based on a heuristic "demerit" function that involves adjusting multiple variables until reaching a desired outcome. This approach defines stretchability and shrinkability of white spaces in a line, and defines a heuristic "badness" measure for each line that provides a scaling factor governing how much each word space is to be adjusted. The system then constructs a undirected graph of all possibilities and uses a deterministic shortest path algorithm to find line break positions that minimize the "badness" scaling factor. The objective is to make the scaling factor as close to zero as possible. Unfortunately, since it involves many variables, the Knuth method is not particularly intuitive. Knuth's "demerits" are hard to change intuitively, and are selected using a great deal of trial and error. Additionally, the Knuth method does not allow a system to "learn" from existing, professionally-set type.

As disclosed herein, another method has been developed for determining the locations of line breaks in a paragraph of text. Unlike the Knuth approach, in the present method this problem can be solved using machine learning. This method provides an alternative formulation that either learns a probabilistic model from analyzing professionally prepared documents, or allows intuitive heuristics.

The method disclosed herein applies both to printed text (e.g. text printed onto a sheet of media) and to rendered text (e.g. text shown on a video display), and allows intuitive specification of inter-word spacings as a probability distribution. The method defines line breaks in terms of a chained probability model of only one variable. This variable can be "learned" by the system based on existing examples of text (e.g. professionally typeset text), or it can be specified by a user. The method builds the probablistic model for a paragraph and finds the optimal sequence of line breaks that maximize the joint distribution of line breaks. The parameters of the model can be learned from data, or they can be set based upon design experience. It has been found that, in the latter case, with a specific heuristic choice of parameters, this algorithm provides a solution that is comparable to that determined by the Knuth and Plass method, providing approximately the same line breaks.

The method disclosed herein includes three basic parts, which are outlined in the flowchart 100 of FIG. 1. First, a probabilistic model for a paragraph is created (step 102). Next, the parameters of the model are set (step 104). These can be learned from data (step 106), or they can be set from design experience (step 108). Finally, an inference is run on the model to find the sequence of line-breaks that maximize the joint probability of line break positions in the paragraph, with minimum deviation of inter-word spacing from an ideal value, in order to find an optimal solution (step 110). When following this method, inter-word spaces are allowed to grow and shrink within a certain tolerance relative to the ideal value. Penalties can also be applied for hyphenation and other characteristics, with the model finding a solution that minimizes all penalties jointly as part of the probability model for the paragraph.

As noted above, the first step in the method is to produce a probabilistic model for line breaking (step 102). This model can be expressed in terms of the location x of the break for a given line of text in a paragraph. In a paragraph of n lines of text, $x_1$ represents the position (that is, the specific space between two adjacent words) of the line break at the end of the first line, $x_2$ represents the position of the line break at the end of the second line, and so on. Thus $x_n$ is the position of the line break at the end of the last line of text in the paragraph. Since each line break position is dependent upon the line break position of the preceding line, the following expression:

$$x_1 \rightarrow x_2 \text{---} \rightarrow x_n \quad (1)$$

denotes that $x_2$ depends upon $x_1$, and so on, until $x_n$ (which, of course, will depend upon $x_{n-1}$). This expression defines a chain graph, wherein each variable is independent of the second preceding variable, given the immediately preceding variable. In other words, using this notation, where $x_j$ represents the location of the line break for the jth line, the value of $x_j$ is independent of $x_{j-2}$, given $x_{j-1}$.

The overall probability P of obtaining a certain series (x) of line breaks becomes:

$$P(x)=P(x_1)P(x_2|x_1)\ldots P(x_{n-1}|x_n) \quad (2)$$

where P denotes the probability of a line break location for a specific line, and $x_{n-1}|x_n$ denotes the break position for line $x_{n-1}$ given the break position for line $x_n$. The probability functions P and P can be any probability function, such as a Gaussian probability function, etc. Stated verbally, the total probability P of obtaining a certain series of line breaks (x) is equal to the product of all of the line break location probabilities for the entire paragraph. In other words, the total probability P is equal to the probability of the location of the first line break $P(x_1)$, times the probability of the location of the second line break $P(x_2|x_1)$, times the probability of the location of the third line break, and so on, to the last line.

The probability function can then be parameterized (step 104) to account for other parameters in addition to line break location. These parameters can include inter-word spacing, special widths (e.g. spacing after punctuation characters), hyphenation, last line distribution, etc. For example, a parameter can be applied for inter-word spacing. This parameter can be a numerical value between zero and 1.0, representing the deviation of inter-word spaces from an ideal value in the particular line of text. For example, where the inter-word spacing in a given line is ideal, this parameter will equal 1.0. Where the inter-word spacing is greater or less than the ideal, this parameter will be some fraction of 1.0. The probability function for that line is multiplied by this parameter, so that the value of the probability function for a given line is at its maximum (with respect to that parameter) when the inter-word spacing is closest to the ideal.

As another example, a hyphenation penalty can be applied to the probability expression for a line that includes a hyphen. Again, this penalty can be a numerical factor between zero and 1.0, and the probability function is multiplied by this factor, to account for the presence of a hyphen. For example, if a hyphen is used on a given line, the probability function can be multiplied by a factor of, say, 0.8, so that the value of the probability function for that line will be less than if no hyphen were used, because hyphenation is discouraged.

Setting the parameters of the model can be done in at least two different ways, as represented by the sub-boxes (106, 108) within box 104 in FIG. 1. In one alternative, these parameters can be learned from data from existing printed material, such as professionally typeset paragraphs (step 106). This is a machine learning or model learning approach. In the model learning approach the breakpoint distribution in a given paragraph of training data can be directly measured (e.g. using optical scanning and software that can estimate typesetting dimensions based upon character size and appearance) in terms of inter-word spaces. The training data can be any selected sample of typeset text, which will have line breaks in specific positions, and varying inter-word spacing that can be directly measured. The first step in this sub-process is to estimate the parameters of the model (break point distribution and inter-word space variation) from the training data.

In one example of the model learning approach, the probability of the line break at the jth line in the sample or training set of text can be expressed as:

$$P(x_j|x_{j-1})=N(\mu_j,\sigma_j) \quad (3)$$

where N is a normal distribution of inter-word spacing in the training set (e.g. a Gaussian distribution or some other distribution), $\mu_j$ is the mean (i.e. the machine learning estimate of the mean) of inter-word spacing in the training set, and $\sigma_j$ is the standard deviation (i.e. the machine learning estimate of the standard deviation) of the distribution.

Alternatively, the parameters of the probability function P(x) can be specified based upon experience (step 108). For example, a desired mean $\mu_j$ and standard deviation $\sigma_j$ of inter-word spacing can be specified for the probability function. If a user considers 6 point inter-word spacing to be ideal, and does not want the inter-word spacing to drop below 4 point nor above 8 point, 6 points can be set as the mean, $\mu_j$, and the standard deviation, $\sigma_j$, can be set equal to 2 points. Since about 95% of the area under a normal curve is within 2 standard deviations of the mean, this parameterization will effectively prevent the inter-word spacing from exceeding 8 points or dropping below 4 points. This is just one example of how the parameters of the model can be set based on a user's experience. Other parameters, including those mentioned above, can also be set in the same or a similar way based upon desired characteristics.

Once the probability function P(x) is created, the method involves running an inference on the trained model to find the sequence of breaks that maximizes the joint distribution of line break locations having minimum deviation of inter-word spacing from an ideal value. (step 110) This is done by running a max-product belief propagation operation to determine the maximum probability. Those of skill in the art will be familiar with max-product belief propagation. Using this process, the peak or maximum value of the parameterized probability function for each line is determined, beginning with the first line of the paragraph and proceeding in order to the last line. As noted above, this is a chain graph process, wherein the value of the probability function for the line break location for the jth line, $x_j$ is independent of $x_{j-2}$, given $x_{j-1}$.

In this process, a generalized factor can be used instead of probabilities, to avoid scaling issues. For example, to find the peak of the probability function for line j, the generalized factor $\phi$ can be used, so that $$P(x_j|x_{j-1}) = \phi(x_j, x_{j-1}) \quad (4)$$

Since the mean of the Gausian curve is the maxima at that value, finding the mean of the probability curve for each line of the paragraph will give the maximum probability P at that line. For the second line of the paragraph, the following expression defines the maxima:

$$T_2(x_2) = \max_{x_1} \phi(x_1)\phi(x_1, x_2) \quad (5)$$

In generalized form, for any line j of the paragraph, this expression becomes:

$$T_j(x_j) = \max_{x_{j-1}} T_{j-1}(x_{j-1})\phi(x_{j-1}, x_2) \quad (6)$$

For the last line of the paragraph, $x_n$, this expression becomes:

$$T_{n+1}(\phi) = \max_{x_n} T_n(x_n) \quad (7)$$

This last expression, equation (7), gives a numerical result $x_n$ representing the line break position for the last line, line n, of the paragraph.

The process then allows the user to find a maximizing sequence of break points by solving the following a series of sub-problems recursively. The first sub-problem is:

$$x_n^* \operatorname{argmax}_{x_n} T_n(x_n) \quad (8)$$

Those of skill in the art will recognize that "arg max" refers to the argument where a function is at a local maxima. For example, in an x-y coordinate system, the arg max for a given function would be the x coordinate value where y is maximum. Generalized for all lines of the paragraph, this expression becomes the second sub-problem in this series:

$$x_{j-1}^* = \operatorname{argmax}_{x_{j-1}} T_{j-1}(x_{j-1})\phi(x_{j-1}, x_j^*) \quad (9)$$

Equations (8) and (9) represent equation (6) solved recursively for all values of x, starting with $x_n$. That is, the value of $x_n$ determined from equation (7) is substituted into equation (6) to solve for $x_{n-1}$, and the resulting value for $x_{n-1}$ is then substituted into equation (6) again to solve for $x_{n-2}$, and so on, from the last line of the paragraph to the first line. This process solves for the joint probability of line break locations that optimizes the parameters of the model jointly for the entire paragraph, including inter-word spacing and any other parameters that are included. This method can produce results that are comparable to those produced by the Knuth method, but follows a more intuitive procedure, and allows learning from existing models of typeset text.

The disclosure thus provides a method for defining line breaks in terms of a chained probability model involving only one variable. This model can be learned from prior examples of professionally typeset data, or it can be set intuitively from design experience. This method can be performed by a computer device having a processor and system memory, wherein the computer device executes machine-readable instructions to construct a probabilistic model for a paragraph, set the parameters of the model, and run an inference on the model to find a sequence of line-breaks that maximize the joint probability of line break positions in the paragraph, in order to find an optimal solution. The parameters of the model can be learned from data, or they can be set from design experience. The specific computer program steps can be stored on computer-readable storage media, and cause the computing device to perform the steps of the method in response to user input, and provide a discernable output via any desirable computer output device.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A method for locating line breaks in text, the method being carried out by a computer device having a processor and system memory, comprising:
    a) creating a probabilistic model of a paragraph of text, parameterized by inter-word spacing; and
    b) running an inference on the model to find a sequence of line-breaks that maximize the joint probability of line break positions with minimum deviation of inter-word spacing from an ideal value, by performing a max-product belief propagation operation to determine the maximum joint probability of line break locations with minimum deviation of inter-word spacing from the ideal value.

2. A method in accordance with claim 1, wherein creating the probabilistic model comprises creating a probability function equal to the product of the probabilities of line break locations for all lines of the paragraph.

3. A method in accordance with claim 2, wherein the probability function is a Gaussian distribution.

4. A method in accordance with claim 1, further comprising setting parameters of the probabilistic model by one of (i) measuring the parameters from a selected sample of typeset text, and (ii) setting the parameters from design experience.

5. A method in accordance with claim 1, further comprising parameterizing the model using parameters selected from the group consisting of special widths, a hyphenation penalty and a last line distribution factor.

6. A method in accordance with claim 1, wherein the probabilistic model comprises a chained probability function.

7. A method for locating line breaks in text, the method being carried out by a computer device having a processor and system memory, comprising:
   a) creating a probability function equal to the product of the probabilities of line break locations for all lines of a paragraph of text;
   b) setting parameters of the model, the parameters including inter-word spacing and line break location; and
   c) performing a max-product belief propagation operation on the model to find a sequence of line-breaks that maximizes the joint probability of line break positions with minimum deviation of inter-word spacing from an ideal value.

8. A method in accordance with claim 7, wherein the parameters of the model further include special widths, a hyphenation penalty and a last line distribution factor.

9. A method in accordance with claim 7, wherein setting the parameters of the probabilistic model comprises a step selected from the group consisting of (i) measuring the parameters from a selected sample of typeset text, and (ii) setting the parameters from design experience.

10. A method in accordance with claim 7, wherein the probabilistic model comprises a chained probability function.

11. A computer program product comprising machine-readable instructions, stored on non-transitory computer-readable storage media, for causing a computing device, including a processor and system memory, to perform the steps of:
   a) creating a probabilistic model of a paragraph of text, parameterized by inter-word spacing; and
   b) running an inference on the model to find a sequence of line-breaks that maximize the joint probability of line break positions with minimum deviation of inter-word spacing from an ideal value, by performing a max-product belief propagation operation.

12. A computer program product in accordance with claim 11, further comprising setting parameters of the probabilistic model by one of (i) measuring the parameters from a selected sample of typeset text, and (ii) setting the parameters from design experience.

13. A computer program product in accordance with claim 11, wherein performing max-product belief propagation operation determines the maximum joint probability of line break locations with minimum deviation of inter-word spacing from the ideal value.

14. A computer program product in accordance with claim 11, wherein the probabilistic model comprises a chained probability function.

\* \* \* \* \*